(12) United States Patent
Becker-Irvin

(10) Patent No.: US 6,759,829 B2
(45) Date of Patent: Jul. 6, 2004

(54) CHARGE CONTROL CIRCUIT FOR A BATTERY

(75) Inventor: Craig H. Becker-Irvin, Redondo Beach, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/242,982

(22) Filed: Sep. 13, 2002

(65) Prior Publication Data

US 2004/0051505 A1 Mar. 18, 2004

(51) Int. Cl.$^7$ .................................................. H02J 7/00
(52) U.S. Cl. ....................................................... 320/128
(58) Field of Search .......................... 320/26, 21, 101, 320/128, 143, 134, 137, 165; 702/63, 130; 324/427, 431; 340/636.12, 636.15

(56) References Cited

U.S. PATENT DOCUMENTS

| | | | | |
|---|---|---|---|---|
| 5,012,176 A | * | 4/1991 | LaForge | 324/427 |
| 5,321,627 A | * | 6/1994 | Reher | 702/63 |
| 5,327,071 A | * | 7/1994 | Frederick et al. | 323/299 |
| 5,576,609 A | * | 11/1996 | Brown et al. | 320/164 |
| 5,869,948 A | * | 2/1999 | Becker-Irvin | 320/101 |
| 6,441,588 B1 | * | 8/2002 | Yagi et al. | 320/139 |
| 6,509,712 B1 | * | 1/2003 | Landis | 320/101 |

* cited by examiner

Primary Examiner—Pia Tibbits
(74) Attorney, Agent, or Firm—Terje Gudmestad

(57) ABSTRACT

A charging circuit (28) particularly suited for use in a satellite (20) has a battery cell (32). A voltage sensor (36) is coupled to the battery for generating a cell voltage signal. A current sensor (34) is coupled to the battery cell (32) and generates a cell charge current signal. A controller (38) is coupled to the voltage sensor (36) and the current sensor (34). The controller (38) determines a compensated voltage in response to the cell voltage signal and the charge current signal and controls the charging of the battery cell (32) in response to the compensated voltage.

16 Claims, 4 Drawing Sheets

US 6,759,829 B2

CHARGE CONTROL CIRCUIT FOR A BATTERY

TECHNICAL FIELD

The present invention relates generally to battery circuits, and more particularly, to a charging circuit for a battery.

BACKGROUND ART

Satellites typically employ batteries that are used particularly when the satellite enters an eclipse. After the satellite leaves an eclipse, there is a need to quickly recharge the battery.

Currently there is a need to incorporate lithium ion batteries into satellites. There are at least two existing methods of recharging lithium ion batteries. Both existing methods are essentially the same in that they require the application of an ever decreasing rate of charge current after the measured battery cell voltage increases to a predetermined threshold. The threshold in both cases is the open circuit cell voltage at a 100 percent state of charge. In one method the battery is charged with constant current until a threshold voltage is reached. The threshold primarily depends on the type of lithium ion cell technology. Upon reaching the threshold voltage, the charge rate is reduced. After reducing the charge rate the cell voltage naturally decreases. The cell is then charged at a reduced charge rate until the voltage reaches the threshold voltage a second time. The charge current is then reduced and the reduction in cell voltage naturally occurs. The cell is then charged again until the threshold voltage is reached. This method of charging is illustrated in FIG. 1. The measured cell voltage is illustrated by line 10. The charge rate is illustrated by line 12, while the state of charge of the battery is illustrated by line 14. As can be seen, the charge rate is reduced in intervals to ultimately achieve 100 percent charge. As can be seen, the battery cell illustrated in the plot of FIG. 1 has an initial state of charge of 40 percent. A constant charge current of 0.2 C is applied for approximately 2.7 hours. At 2.7 hours the cell voltage reaches the threshold of 4.1 volts and the charge current is reduced to approximately 0.1 C. This causes a reduction in cell voltage. As the cell voltage increases and reaches the voltage threshold again at approximately 3.0 hours, the charge current is reduced to approximately 0.05 C. This pattern is repeated until the threshold voltage is reached and the battery charge current has reduced to less than 0.002 C. As can be seen, the lithium ion battery cell took approximately five hours to increase the cell state from a charge of 40 percent to 100 percent. This time is relatively large for a satellite system in a low or medium earth orbit.

Therefore, it is desirable to reduce the amount of time to recharge a battery particularly in satellite applications particularly for orbit periods less than 12 hours.

SUMMARY OF THE INVENTION

The present invention provides an improved control circuit and method for charging battery cells in less time than previously known circuits.

In one aspect of the present invention, a charging circuit for a battery includes a voltage sensor that is coupled to the battery for generating a cell voltage. A current sensor is coupled to the battery for generating a cell charge current signal. A controller is coupled to the voltage sensor and the current sensor. The controller determines a compensated voltage in response to the cell voltage and the charge current signal and controls the battery in response to the compensated voltage.

In a further aspect of the invention, a method for charging a battery comprises measuring a cell voltage, measuring a cell charge current, determining a compensated voltage in response to the cell voltage and the cell charge current, comparing the compensated voltage to a threshold, and discontinuing the cell charge current when the compensated voltage exceeds the threshold.

One feature of the invention is that the circuit and method may be applied to single cell battery systems and multiple cell battery systems. One advantage of the system is that the charge time for batteries is significantly reduced. This improves the performance of spacecraft particularly after an eclipse.

Other advantages and features of the present invention will become apparent when viewed in light of the detailed description of the preferred embodiment when taken in conjunction with the attached drawings and appended claims.

BEST MODES FOR CARRYING OUT THE INVENTION

Figure 1:
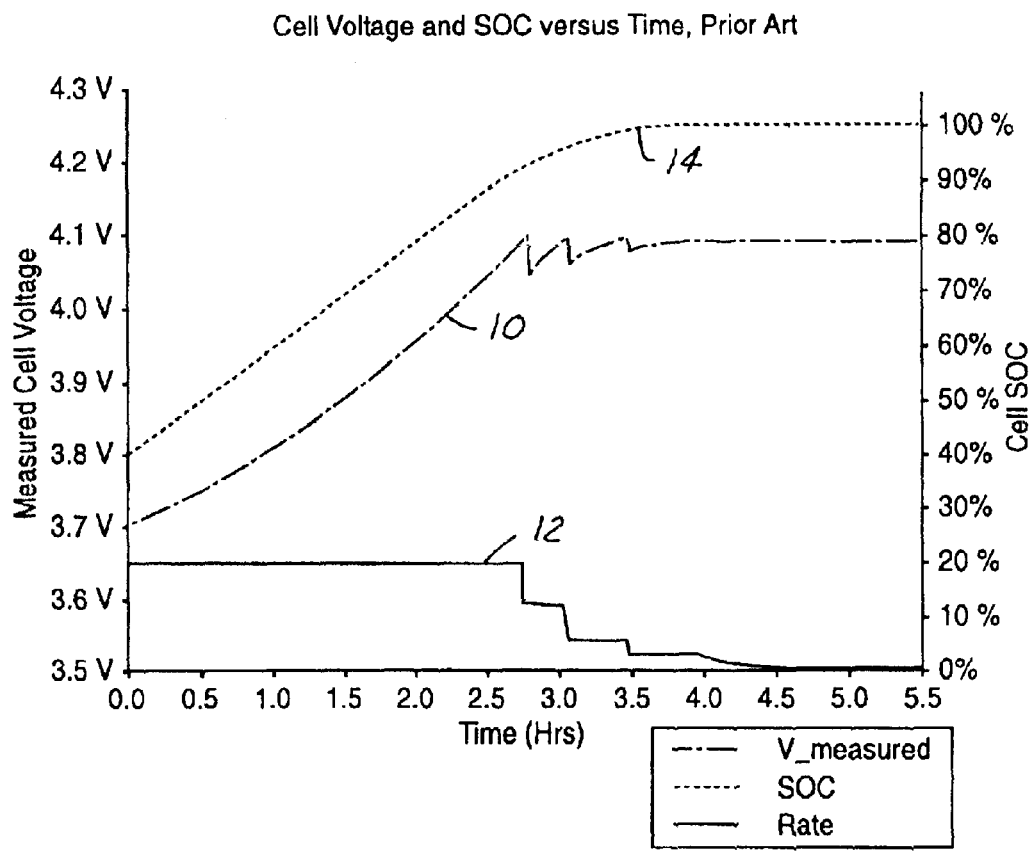
FIG. 1 is a plot of cell voltage, cell state of charge and charge rate versus time for a conventional charge circuit.

In the following figures the same reference numerals will be used to identify the same components. While the present invention is described with respect to a spacecraft, the present invention is applicable to various types of batteries or battery systems including electric vehicles. Also, the present invention is described with respect to a lithium ion battery. Those skilled in the art will recognize that the present invention is also applicable to various types of batteries.

Figure 2:
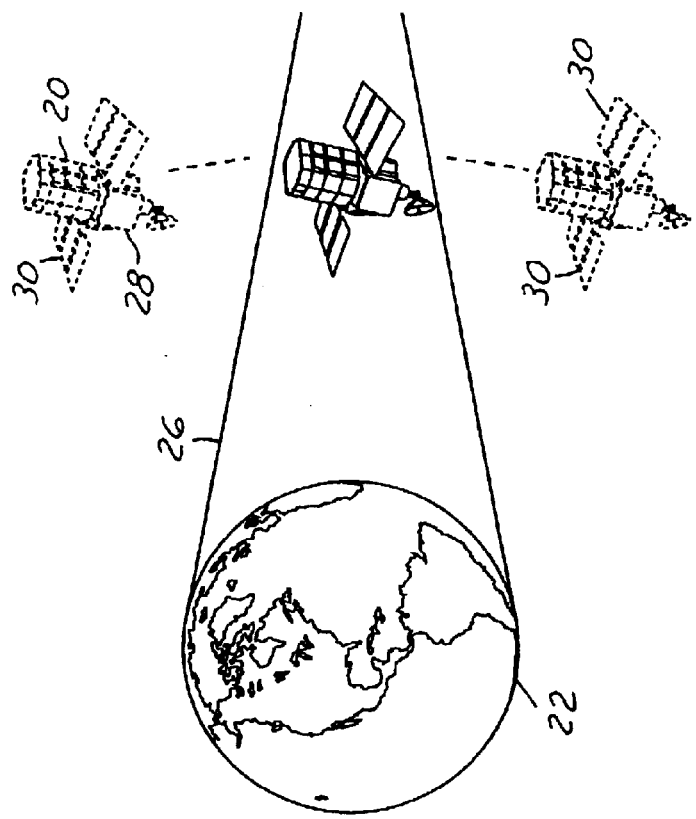
FIG. 2 is a diagrammatic view of a satellite relative to the earth and sun.
Figure 2:
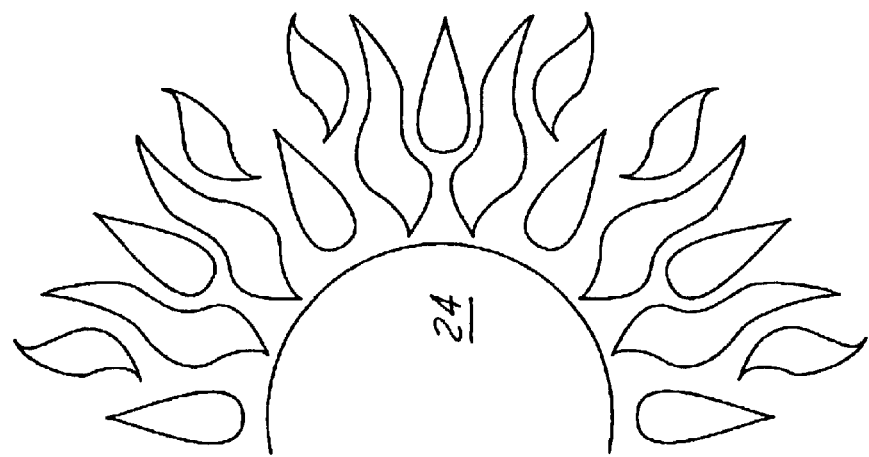

Referring now to FIG. 2, a satellite 20 is shown in various positions with respect to earth 22. Earth 22 is positioned relative to sun 24. At various times earth 22 casts an eclipse shadow 26 in the path of satellite 20.

Satellite 20 includes a charging circuit 28 according to the present invention. Charging circuit 28 is connected to the spacecraft power bus and ultimately to solar arrays 30.

Figure 3:
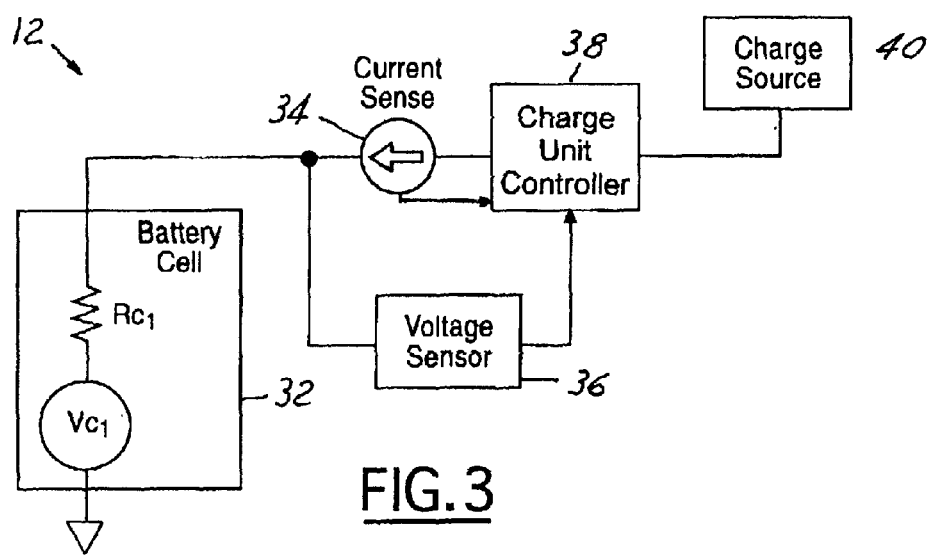
FIG. 3 is a block diagrammatic schematic view of a charge circuit for a single cell battery according to the present invention.

Referring now to FIG. 3, a charging circuit 28 formed according to the present invention is illustrated. Charging circuit 28 includes a battery cell 32 which includes a parasitic DC resistance $RC_1$ and a cell voltage $VC_1$.

In the present invention a compensated battery cell voltage is used to determine when battery charging is to cease. The voltage compensation $V_{compensated} = V_{meaasured} - I_{cell} \times R_{cell} + V_o$, where $V_{measured}$ is the measured cell voltage, $I_{cell}$ is the cell charge current in amperes, $R_{cell}$ is the characterized DC resistance of the battery cell, and $V_o$ is an arbitrary offset voltage. Thus, a current sensor 34 is used to measure the battery charge current. A voltage sensor 36 is used to measure the cell voltage. Both the current sensor 34 and the voltage sensor 36 are coupled to a charge unit controller 38. Charge unit controller 38 is coupled to a charge source 40. Charge source 40 may, for example, include a solar array.

Charge unit controller 38 may be microprocessor based. Of course, other types of control devices would be evident to those skilled in the art. Charge unit controller 38 compares the compensated cell voltage $V_{compensated}$ to a threshold voltage and terminates battery charging when the compensated voltage reaches the threshold.

Figure 4:
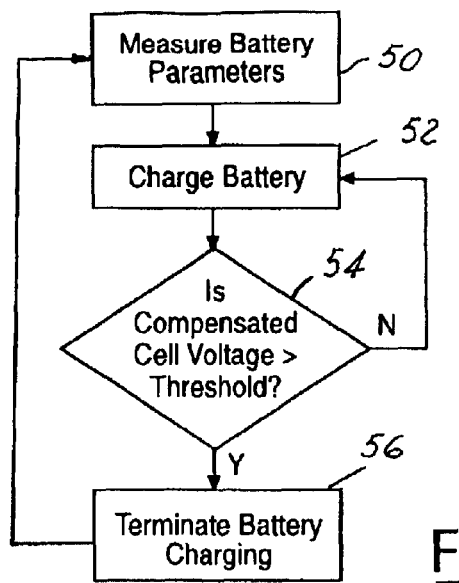
FIG. 4 is a flow chart illustrating the method for charging a battery according to the present invention.

Referring now to FIG. 4, The method of the present invention starts after leaving an eclipse and should have the battery charge before entering another eclipse. The method for charging a battery includes measuring various battery parameters such as the cell charge current, the cell voltage and the characterized DC resistance of the battery cell. The characterized DC resistance $R_{cell}$ may be easily determined by test for each type of battery. The battery parameters are measured in step 50. In step 52 the charging of the battery is performed by applying a charge current to the battery from a charge source 40 through charge unit controller 38. In step 54 the compensated cell voltage is compared to a threshold voltage. The threshold voltage, it should be noted, is the open circuit cell voltage at 100 percent state of charge. In step 54 if the cell voltage is not greater than the cell voltage the battery continues to charge in step 52. If the compensated cell voltage is greater than the threshold voltage, battery charging is terminated in step 56. This should be completed before entering an eclipse. The process continues to measure the battery parameters in step 50 to determine whether or not charging is desirable such as after leaving an eclipse.

Figure 5:
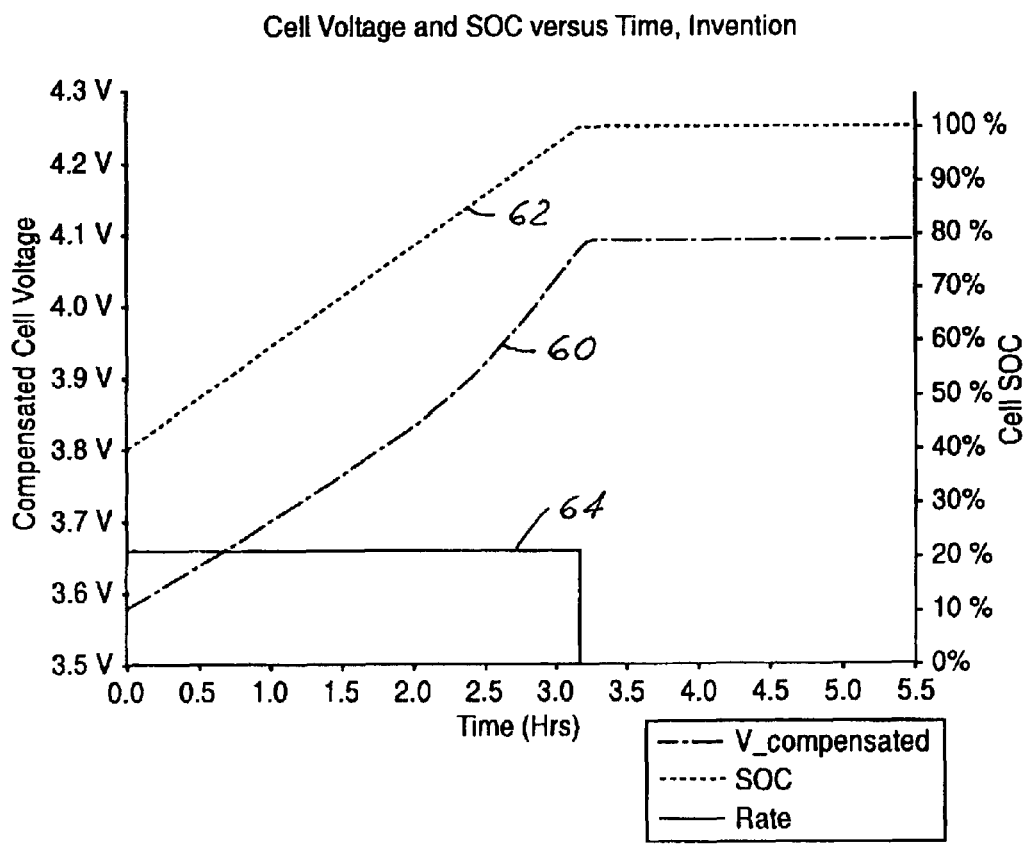
FIG. 5 is a plot of cell voltage, state of charge and charge rate versus time for the circuit according to the present invention.

Referring now to FIG. 5, a similar plot to that shown in FIG. 1 is illustrated using the present invention. As can be seen, the compensated battery voltage 60 rises monotonically in response to the increasing battery state of charge illustrated by line 62. As can be seen, the battery reaches 100 percent state of charge sooner than that of FIG. 1. It should be noted that in both FIG. 1 and FIG. 5, the same total ampere hours are required to increase the battery state of charge. Thus, the present invention advantageously shortens the amount of time to reach 100 percent state of charge.

Figure 6:
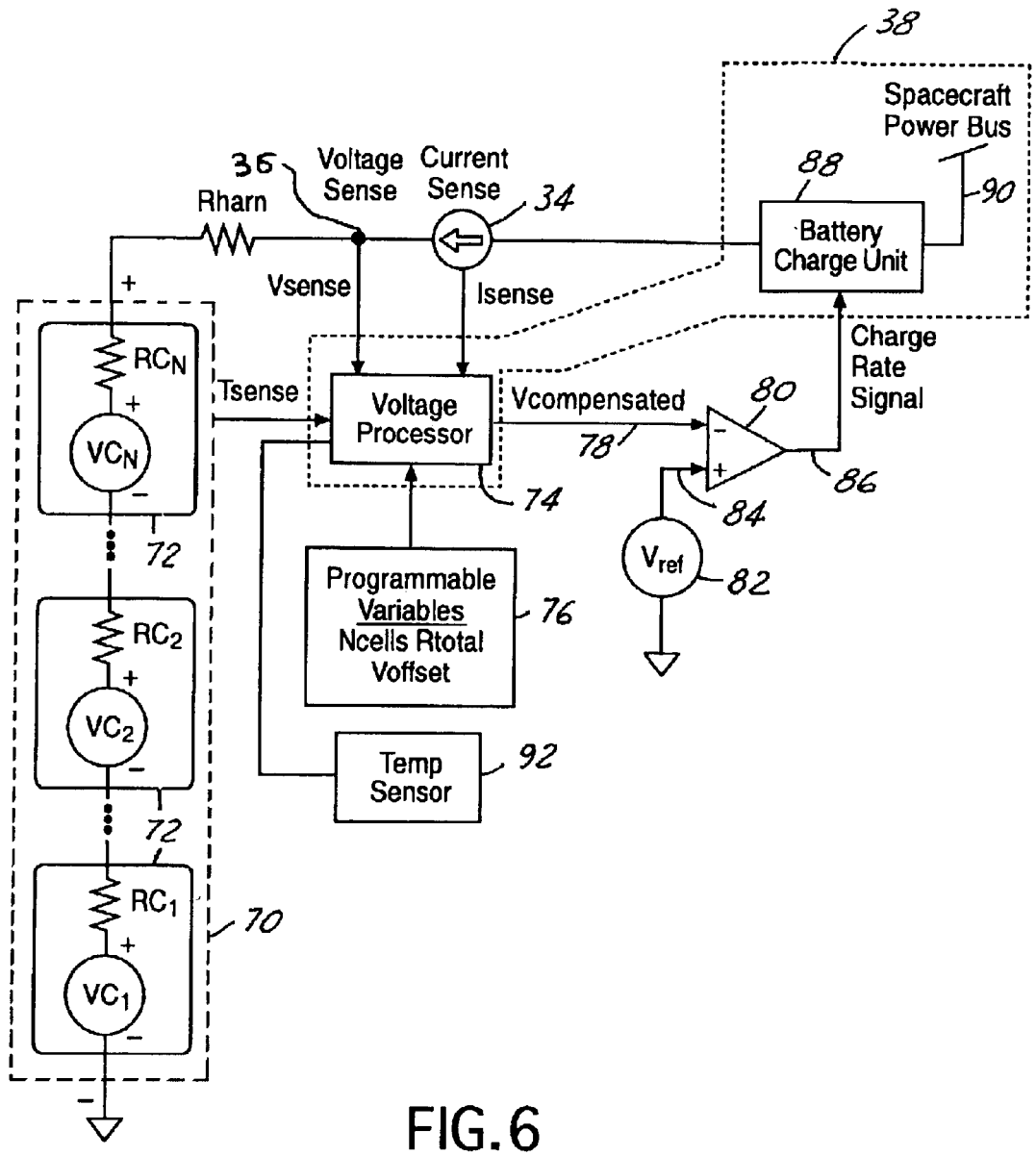
FIG. 6 is a schematic view of a power system for a spacecraft including a charging circuit according to the present invention.

Referring now to FIG. 6, the present invention may also be applied to a multi-cell battery 70 having Ncells 72. In this case, the battery voltage is normalized to the voltage of a single cell by considering the number of battery cells and the total battery system resistance including cell resistance and an external harness resistance $R_{harn}$. When applied to a multi-cell battery, the voltage compensation ($V_{compensated}$) takes the form:

$$Vcompensated = \frac{Vmeasured - Ibattx(Ncells \times Rcell + Rharn)}{Ncells} + Vo$$

The resistance terms may be further simplified at a system level by characterization testing which determines the total battery resistance, including both external battery harnessing and the total internal resistances of individual series connected cells. This embodiment is similar to that shown in FIG. 3 above in that a current sensor 34 is provided. A compensated voltage is provided using a voltage processor 74. The current sensor 34 is also coupled to voltage processor 74 which receives a sensed current $I_{sense}$. Various program variables 76 including the number of cells, the total resistance and the voltage offset are programmed variables provided to voltage processor 74. The voltage processor generates a compensated voltage $V_{compensated}$ which is coupled to an inverting input 78 of a comparator 80. A reference voltage 82 is coupled to a non-inverting input 84 of comparator 80. From this comparison a charge rate signal is generated at output 86 of comparator 80. The output 86 is coupled to a battery charge unit 88. Battery charge unit 88 controls the coupling of spacecraft power bus 90 to the cells 72 of battery 70.

The resistance terms of the multi-cell configuration are simplified by system level characterization testing which determines the total battery system resistance $R_{total}$. This includes both external battery harnessing and the total internal resistance of the individual series connected cells. The characterization is performed in the following way. The battery charge unit charges the battery at a nominal charge rate. While charging, the battery current $I_{sense}$ and battery voltage $V_{sense1}$ is recorded. Next, the battery charging is terminated. The battery voltage is allowed to stabilize then the battery voltage $V_{sense2}$ is recorded. The total resistance $R_{total}$ is determined using Ohms law by taking the difference between $V_{sense1}$ and $V_{sense2}$ and dividing by the battery current $I_{sense}$. The above method is based on the knowledge that the battery state of charge does not change after the battery charging was terminated. Furthermore, given a set of circumstances, there is a direct relationship between the open circuit voltage of a lithium ion battery cell and its state of charge The only condition that changes between the time when the battery voltage was measured during charging and when the battery voltage was measured after termination was a change in battery charge rate. Therefore, any change in the measured battery voltage is due entirely to an effect which is accurately estimated as an IR drop of magnitude $I_{sense}*R_{total}$. By characterizing the total battery resistance $R_{total}$ the voltage compensation equation may be simplified to $$Vcompensated = \frac{Vmeasured - Ibatt \times Rtotal}{Ncells} + Vo$$

where
Vmeasured is the measured cell voltage signal
Ibatt is the measured battery charge current in amperes
Rtotal is a characterized DC resistance of the total battery and associated harness
Ncells is a number of series connected battery cells
Vo is an arbitrary offset voltage.

It should be noted that the voltage processor receives programmable variables that may be reprogrammed. $V_{reference}$ from voltage reference source 82 may also be reprogrammed. $V_{reference}$ is a voltage threshold. A temperature sensor 92 having an input $T_{sens}$ may also be coupled to voltage processor 94. This will allow the voltage processor to take into consideration any temperature change if desirable for a particular program.

If the terms such as $V_o$ are chosen correctly the state of charge will be 100% when the battery charge current is terminated. Therefore, $V_o$ is determined experimentally.

While particular embodiments of the invention have been shown and described, numerous variations and alternate embodiments will occur to those skilled in the art. Accordingly, it is intended that the invention be limited only in terms of the appended claims.

What is claimed is:

1. A charging circuit for a battery comprising:
    a voltage sensor coupled to the battery for generating a cell voltage signal;

a current sensor coupled to the battery for generating a cell charge current signal; and a controller coupled to said voltage sensor and said current sensor, said controller determining a compensated battery cell voltage in response to the cell voltage signals direct current resistance of the cell, and the charge current signal, said controller charging the battery when the compensated voltage signal is below a voltage threshold.

2. A charging circuit as recited in claim 1 wherein the compensated battery cell voltage is determined in response to harness resistance.

3. A charging circuit as recited in claim 1 wherein the threshold is reprogrammable.

4. A charging circuit as recited in claim 1 wherein the battery comprises a lithium ion battery.

5. A charging circuit as recited in claim 1 wherein the compensated battery cell voltage is determined by $V_{measured} - I_{cell} \times R_{cell} + V_o$ where $V_{measured}$ is the cell voltage signal, $R_{cell}$, is the direct current resistance, $I_{cell}$ is the cell charge current signal and $V_o$ is an offset voltage.

6. A satellite comprising:

a battery;

a charging circuit coupled to the battery;

a voltage sensor coupled to the battery for generating a cell voltage signal;

a current sensor coupled to the battery for generating a cell charge current signal; and a controller coupled to said voltage sensor and said current sensor, said controller determining a compensated battery cell voltage in response to the cell voltage signal, direct current resistance of the cell, and the charge current signal, said controller charging the battery when the compensated voltage signal is below a voltage threshold.

7. A satellite as recited in claim 6 wherein said battery comprises a lithium ion battery.

8. A satellite as recited in claim 6 wherein the compensated battery cell voltage is determined by the formula $$Vcompensated = \frac{Vmeasured - Ibatt \times Rtotal}{Ncells} + Vo$$

where $V_{measured}$ is the measured cell voltage signal,

Ibatt is the measured battery charge current in amperes,

Rtotal is a characterized DC resistance of the total battery and a harness,

Ncells is a number of series connected battery cells, and

Vo is an arbitrary offset voltage.

9. A satellite as recited in claim 8 wherein the arbitrary offset voltage is zero.

10. A satellite as recited in claim 6 wherein said battery comprises a plurality of cells.

11. A satellite as recited in claim 6, wherein the compensated battery cell voltage is determined in response to harness resistance.

12. A satellite as recited in claim 6 wherein the threshold is reprogrammable.

13. A satellite as recited in claim 7 wherein said controller comprises a voltage processor and a battery charge unit.

14. A method for charging a battery comprises:

measuring a cell voltage;

measuring a cell charge current;

determining a compensated voltage in response to the cell voltage, the direct current cell resistance, and the cell charge current;

comparing the compensated voltage to a threshold; and discontinuing the cell charge current when the compensated voltage exceeds the threshold.

15. A method as recited in claim 14 wherein said battery comprises a lithium ion battery.

16. A method as recited in claim 14 wherein said threshold is reprogrammable.

* * * * *

UNITED STATES PATENT AND TRADEMARK OFFICE
CERTIFICATE OF CORRECTION

PATENT NO. : 6,759,829 B2
DATED : July 6, 2004
INVENTOR(S) : Craig H. Becker-Irvin It is certified that error appears in the above-identified patent and that said Letters Patent is hereby corrected as shown below:

<u>Column 5,</u>
Line 6, insert -- signal, direct current resistance of the cell, and the --
Line 20, insert -- signal, $R_{cell}$ is the direct current resistance, $I_{cell}$ is the cell --

Signed and Sealed this

Sixteenth Day of November, 2004

JON W. DUDAS
*Director of the United States Patent and Trademark Office*